US012699718B2

(12) United States Patent
Sridhar et al.

(10) Patent No.: US 12,699,718 B2
(45) Date of Patent: Aug. 4, 2026

(54) REASONING SYSTEM FOR PERFORMING QUESTIONING AND ANSWERING

(71) Applicant: QUALCOMM Incorporated, San Diego, CA (US)

(72) Inventors: Arvind Krishna Sridhar, San Diego, CA (US); Yinyi Guo, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/587,666

(22) Filed: Feb. 26, 2024

(65) Prior Publication Data

US 2025/0272316 A1 Aug. 28, 2025

(51) Int. Cl.
| | |
|---|---|
| *G06F 16/3329* | (2025.01) |
| *G06F 16/34* | (2025.01) |
| *G06F 40/30* | (2020.01) |

(52) U.S. Cl.
CPC ........ *G06F 16/3329* (2019.01); *G06F 16/345* (2019.01); *G06F 40/30* (2020.01)

(58) Field of Classification Search
CPC ..... G06F 16/3329; G06F 16/345; G06F 40/30
See application file for complete search history.

(56) References Cited

U.S. PATENT DOCUMENTS

| | | | | | |
|---|---|---|---|---|---|
| 6,470,333 | B1 * | 10/2002 | Baclawski | .......... | G06F 16/2255 |
| | | | | | 707/999.005 |
| 12,046,062 | B2 * | 7/2024 | Sharma | .................. | G06V 30/41 |

| | | | | | |
|---|---|---|---|---|---|
| 2009/0132252 | A1 * | 5/2009 | Malioutov | ............ | G06F 16/685 |
| | | | | | 704/258 |
| 2014/0380266 | A1 * | 12/2014 | Bornhoevd | ....... | G06F 16/24532 |
| | | | | | 717/104 |
| 2018/0089263 | A1 * | 3/2018 | Gerard | .............. | G06F 16/24535 |
| 2021/0240776 | A1 | 8/2021 | Jawagal et al. | | |
| 2022/0222436 | A1 * | 7/2022 | Perez | ....................... | G06N 3/04 |

(Continued)

FOREIGN PATENT DOCUMENTS

CN       118035401 A   *   5/2024   ............... G06N 3/08

OTHER PUBLICATIONS

Difei Gao, Lei Ji, Luowei Zhou, Kevin Qinghong Lin, Joya Chen, Zihan Fan, Mike Zheng Shou, "AssistGPT: A General Multi-modal Assistant that can Plan, Execute, Inspect, and Learn", 2023, https://arxiv.org/abs/2306.08640 (Year: 2023).*

(Continued)

*Primary Examiner* — Eric Yen
(74) *Attorney, Agent, or Firm* — QUALCOMM Incorporated; Espartaco Diaz Hidalgo

(57) ABSTRACT

Certain aspects of the present disclosure provide techniques for generating an answer using a reasoning system. In examples, a query related to at least one input signal and contextual information associated with the at least one input signal can be obtained. Using a machine learning model, one or more reasoning paths based on the contextual information and the query can be generated, where each of the one or more reasoning paths includes a sequence of respective one or more sub-queries and respective one or more sub-query answers corresponding to the respective one or more sub-queries. An answer to the query based on at least one of the one or more reasoning paths can be generated and provided as an output.

20 Claims, 10 Drawing Sheets

(56) References Cited

U.S. PATENT DOCUMENTS

2023/0034450 A1      2/2023  Sridhar et al.
2023/0365146 A1*  11/2023  Creswell .............. B60W 50/06
2025/0165466 A1*   5/2025  Tong ................. G06F 16/24522

OTHER PUBLICATIONS

Google Translation of CN 118035401 A, 2024, https://patents.google.com/patent/CN118035401A/en?oq=CN+118035401+A (Year: 2024).*
Mei X., et al., "WavCaps: A ChatGPT-Assisted Weakly-Labelled Audio Captioning Dataset for Audio-Language Multimodal Research", arXiv:2303.17395v1 [eess.AS] Mar. 30, 2023, pp. 1-13.
Qi J., et al., "The Art of Socratic Questioning: Recursive Thinking with Large Language Models", arXiv:2305. 14999v2 [cs. CL] Nov. 2, 2023, 23 Pages.
Zhang Z., et al., "Enriching Ontology with Temporal Commonsense for Low-Resource Audio Tagging", arXiv:2110.01009v1 [cs.SD] Oct. 3, 2021, 5 Pages.
Zhao Y., et al., "Knowing What LLMs Do Not Know: A Simple Yet Effective Self-Detection Method", arXiv:2310.17918v1 [cs.CL] Oct. 27, 2023, 12 Pages.
International Search Report and Written Opinion—PCT/US2025/013437—ISA/EPO—Apr. 14, 2025.
Li G., et al., "Learning to Answer Questions in Dynamic Audio-Visual Scenarios", IEEE/CVF Conference on Computer Vision and Pattern Recognition (CVPR), IEEE, Jun. 18, 2022, pp. 19086-19096, XP034195231, Section 4, p. 19090-p. 19091, Figure 3.
Sridhar A.K., et al., "Enhancing Temporal Understanding in Audio Question Answering for Large Audio Language Models", arXiv: 2409.06223v1 [cs.SD], arxiv.org, Cornell University Library, 201 Olin Library Cornell University Ithaca, NY 14853, Sep. 10, 2024, XP091880010, 5 pages.

* cited by examiner

900

A method for generating an answer to a query

910
Obtain a query related to the at least one input signal

920
Obtain contextual information

930
Generate one or more reasoning paths based on the contextual information and the query 940
Generate an answer to the query based on at least one of the one or more reasoning paths 950
Output the answer

1000

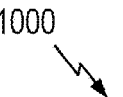

1002

Processing System — 1006

1020

Processor(s)

1021

Circuitry for obtaining a query

1022

Circuitry for obtaining contextual information

1023

Circuitry for generating one or more reasoning paths

1024

Circuitry for generating an answer

1025

Circuitry for outputting an answer

1030

Computer-Readable Medium/Memory

1031

Code for obtaining a query

1032

Code for obtaining contextual information

1033

Code for generating one or more reasoning paths

1034

Code for generating an answer

1035

Code for outputting an answer

*FIG. 10*

REASONING SYSTEM FOR PERFORMING QUESTIONING AND ANSWERING

INTRODUCTION

Field of the Disclosure

Aspects of the present disclosure relate to reasoning systems for performing questioning and answering.

Description of Related Art

Content question answering systems have been developed to provide answers to queries (also referred to as questions) related to the content of one or more input signals, such as audio, video, and/or other sensor data. Typically, these systems utilize encoders to encode the input signal(s) and query (e.g., in the form of text, audio, etc.) into representative features, and decoders to generate an answer (e.g., in the form of text, audio, etc.) based on these encoded features. For example, recurrent neural network architectures have been used, where the input signal(s) and query are encoded separately before concatenating and decoding to output an answer.

While these content question answering systems can provide basic fact-based answers, there is a growing need to incorporate more advanced reasoning capabilities. As an example, existing content questioning systems may analyze a video input signal of a street scene to recognize individual elements like cars, people, buildings, etc. If the existing content questioning system were asked, "how many cars are there?" it may count the detected vehicle objects and output a number. However, when asked, "did the grey car run the red light?" the existing content questioning system lacks understanding of logical relationships between objects and events, such as events unfolding in a sequence. Thus, the ability to perform temporal, relational and logical reasoning based on events captured in input signal(s) shows promise for new applications. As one example, reasoning over time series sensor data has applications in health monitoring. As another example, analyzing sequences in visual, audio, and/or other sensor data signals has applications in autonomous systems.

SUMMARY

One aspect provides a method for generating an output answer using a reasoning system. In examples, the method comprises: obtaining a query related to at least one input signal; obtaining contextual information associated with the at least one input signal; generating, using at least one machine learning model, one or more reasoning paths based on the contextual information and the query, each of the one or more reasoning paths comprising a sequence of respective one or more sub-queries and respective one or more sub-query answers corresponding to the respective one or more sub-queries; generating an answer to the query based on at least one of the one or more reasoning paths; and outputting the answer.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 depicts an example processing system of a reasoning system.

DETAILED DESCRIPTION

Figure 1:
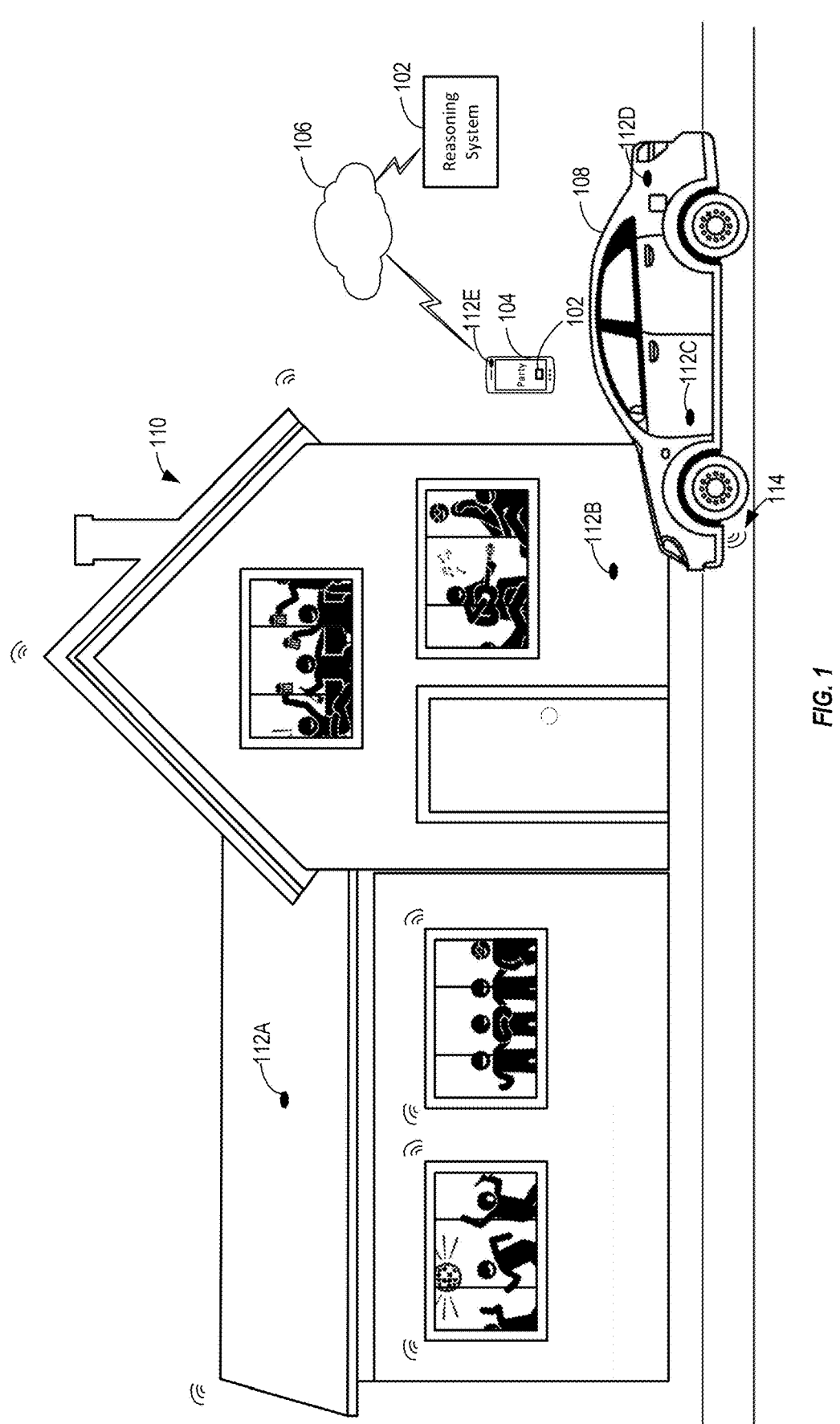
FIG. 1 depicts an example reasoning system for question answering.

Aspects of the present disclosure provide apparatuses, methods, processing systems, and computer-readable mediums for generating an output answer using a reasoning system.

Content question answering systems attempt to provide descriptive or fact-based answers to natural language questions related to the content of one or more input signals, such as audio, video, other sensor data, and/or the like. However, existing question answering system capabilities are limited. Specifically, current systems lack sophisticated reasoning abilities beyond merely retrieving facts, restricting the complexity of queries they can meaningfully respond to.

In addition, current systems predominantly focus on interpreting fixed context input provided in relation to a specific question, without considering long-term historical data that could aid reasoning over trends and frequencies. Accordingly, some aspects provide long-term historical data to enhance reasoning capabilities in relation to content question answering.

As described herein, a reasoning system receives input, such as one or more input signals that could be audio, video, sensor readings, or other signals, such as signals captured in real-world environments over time. The input may contain signals indicative of one or more events, such as audio of a dog barking, video of a car turning, a temperature reading at a particular time, and/or the like. The input may then be encoded, and in some cases stored. In certain aspects, when a user asks a question related to the input, the reasoning system generates one or more reasoning paths to determine how different events recorded by the input could relate to and answer the question. In some aspects, a reasoning path may be a series of sub-queries that are automatically generated to follow up with the user question, where each sub-query aims to fill in gaps in understanding by requesting additional details about the events from a model, such as a language model. In certain aspects, the reasoning system utilizes scoring to determine how confident it is about each reasoning path, such as to focus on reasoning paths that have a higher confidence level of producing an accurate answer to the query. The reasoning system may provide an answer associated with a reasoning path (e.g., reasoning path with a highest confidence score), or multiple reasoning paths. In some aspects, the reasoning system may output information indicative of the reasoning path(s) used to generate the answer, such as indicating the reasoning behind the answer, which may help a user better understand the answer. In certain aspects, the reasoning system can provide multiple alternative answers, such as based on multiple different reasoning paths, such as if the confidence level is not high.

In certain cases, a reasoning system as described herein provides a technical solution to the problem of limited reasoning and explanatory abilities in existing question answering systems. The reasoning architecture and iterative question-answer reasoning path creation process may enable a logical analysis of input signals not practicable using conventional recurrent or transformer models. Further, the reasoning system may generate customized reasoning paths that are tailored to an input query and an input signal to provide answers more closely aligned to the input query. In certain aspects, techniques described herein may technically advance the field of content-based question answering through customized, transparent reasoning.

In certain aspects, the reasoning system leverages cross-attention, attribute extraction, context searches and multi-path chaining to piece together explanatory answers from other relevant inputs to output an answer to a query and, in some instances, convey meaning associated with the answer. In certain aspects, techniques described herein may provide organizations with automated assistants able to surface non-obvious insights from extensive datasets and justify conclusions in understandable terms.

As one example, in certain aspects the techniques disclosed herein can provide value in domains like healthcare where extensive multivariate datasets require analysis. For example, in certain aspects, the reasoning system may process patient vitals, scan outputs, audio transcripts and/or lab metrics over time to surface insights. A clinician querying if a treatment is working may receive an answer like "Yes, coughing frequency has decreased 20% over two weeks since starting medication X per home audio scans." In certain aspects, the clinician may further receive detailed reasoning to surface relevant signal segments (e.g., portions of an audio signal associated with coughing) and highlight trends (e.g., coughing frequency is trending downward). This may provide health care providers with a more usable manner to parse patient signals and improve diagnostic capabilities.

Example Environment for Reasoning System for Performing Questioning and Answering FIG. 1 illustrates an example reasoning system 102 for question answering, in accordance with aspects of the present disclosure. The reasoning system 102 receives input signals, such as from one or more sensors, such as sensors 112A-E. Sensors 112A-E can include microphones, cameras, wearables, instruments, appliances, vehicles, and/or the like. The sensors may capture audio, visual, diagnostic, location, motion, environmental and/or other data, such as related to people, scenes, surroundings, events, and/or the like.

As an example, sensors 112A and 112B could be integrated into a house 110 or home system, and capture information, such as audio data, emanating from house 110. For example, the sensors 112A and 112B could be associated with a security camera. Sensors 112C and 112D could be integrated into an automobile 108 and capture information, such as audio data, of the automobile's engine and brake noises 114 as well as information, such as audio data, emanating from the house 110. Sensor 112E could be integrated into a device 104, such as a mobile device or other user equipment (UE), and capture information, such as audio information, associated with the automobile 108 as well as the house 110.

A user can submit a query to reasoning system 102, potentially referencing details or events detected within one or more of the input signals from sensors 112A-E. For example, a query could include what is happening in the house, is there a problem with the car, was there an accident, and/or the like. The reasoning system 102 can then perform reasoning using one or more of the input signals from sensors 112A-E to generate an appropriate response to the query. In examples, the reasoning system 102 can analyze different events spread across an input timeline to make logical connections between potentially disparate event occurrences occurring within one or more of the signals from sensors 112A-E. The reasoning system 102 can then provide an answer to the query, and in certain aspects, also provide underlying reasoning detailing the decision making logic applied to obtain the answer.

As depicted in FIG. 1, the reasoning system 102 can reside at a device 104, or can be accessible via a network or cloud environment 106. In some examples, the reasoning system 102 may rely on one or more input signals, such as from sensors 112A-E that are associated with a user or user device. For example, the reasoning system 102 may utilize an input signal from sensor 112E to generate an answer as further described herein. Alternatively, or in addition, the reasoning system 102 may generate an answer based on one or more input signals, such as associated with one or more sensors 112A-112E. Although sensors 112A-112E are depicted as being associated with a house 110, automobile 108, and/or device 104, it should be understood that such sensors could be located in different environments and obtain different types of content, such as but not limited to health data, audio data, video data, etc.

Figure 2:
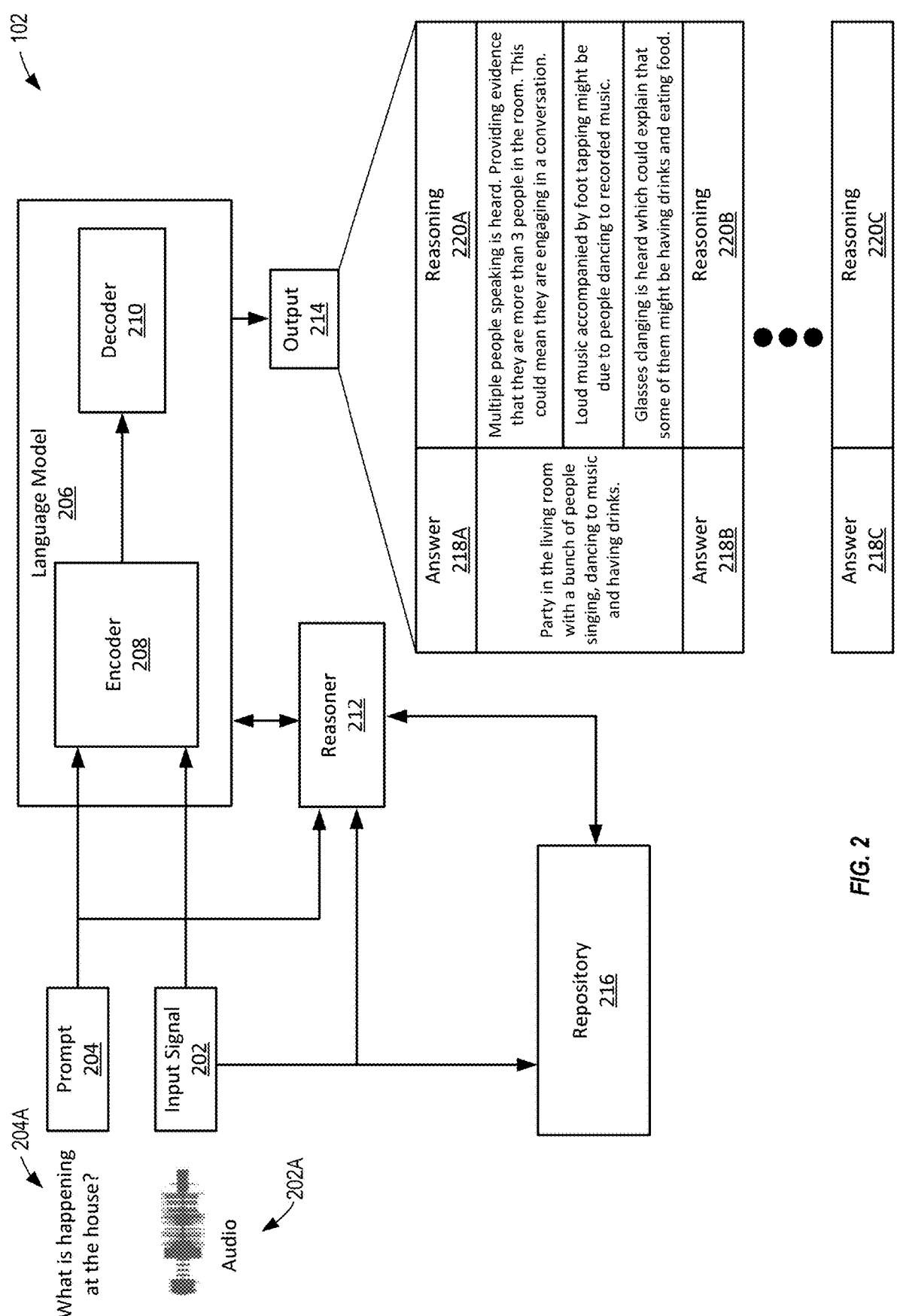
FIG. 2 depicts additional details of a reasoning system in accordance with examples of the present disclosure.

FIG. 2 depicts additional details of the reasoning system 102 in accordance with certain aspects of the present disclosure. The reasoning system 102 can include a language model 206 that includes an encoder 208 and a decoder 210. The encoder 208 can receive an input signal 202 and encode the input signal 202 into an encoded representation, such as a feature vector, that encodes relevant information from the input signal 202. In some aspects, a feature vector refers to properties, attributes, or embeddings that capture meaningful semantics for performing a reasoning process. Examples of feature representations can include, but are not limited to, audio events, speaker identities, or semantic tags for an audio signal; speech tags and named entities for text; and detected objects, scene categories, or extracted text for images or video.

In certain aspects, the encoder 208 can convert multiple different types of input signals 202 into respective encoding representations. In certain aspects, different encoder architectures can be used based on the data type of the input signals (audio, video, sensors), such as using encoder architectures designed specifically for that signal modality. An audio signal is an example of an input signal 202A provided to the encoder 208. Example encoders 208 include, but are not limited to, CLIP®, Bert®, and ROBERTa®.

In some aspects, the encoder 208 receives a prompt 204 and encodes the prompt into an encoded representation, such as a feature vector, that encodes relevant information from the prompt 204. The prompt 204 can be a query (e.g., 204A) from a user and can be acquired as a text prompt, an audio prompt, a video prompt, etc. For example, the prompt 204 can be a text prompt, such as "what is happening at the house?" In certain aspects, the encoder 208 can convert the prompt 204 into an encoded representation having a same embedding space as the input signal 202. Being in the same embedding space means that the encoded representations of the prompt 204 and the input signal 202 have compatible and comparable feature representations that allow them to be jointly analyzed by downstream components. That is, by encoding the prompt 204 and the input signal 202 into the same embedding space, a model can understand and directly compare the semantic meaning between the query in the prompt 204 and content events within the input signal 202 for improved reasoning.

Figure 6:
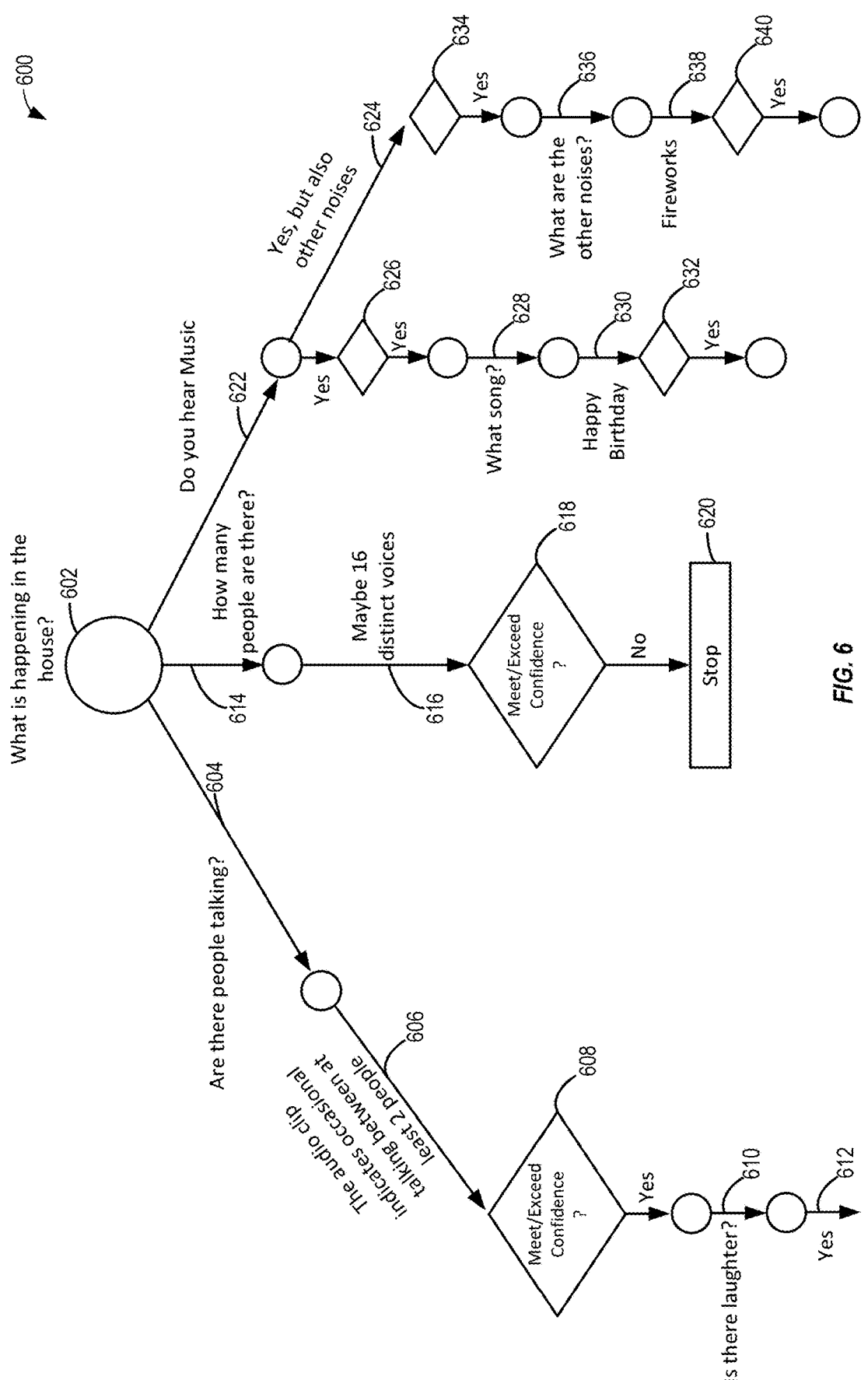
FIG. 6 depicts additional details with respect to creating and traversing reasoning paths.

The language model 206 can interact with the reasoner 212 to generate one or more reasoning paths, as described with respect to FIG. 6. A reasoning path represents a chain of logical reasoning undertaken by the reasoner 212 to incrementally build support and understanding about the prompt 204. In examples, the reasoner 212 can generate one or more reasoning paths comprising sequences of sub-queries and answers.

In some aspects, the reasoner 212 analyzes characteristics of the input signal 202 to generate attributes that may be relevant to understanding or explaining one or more aspects of input signal 202, where an attribute refers to a characteristic or property of the input signal 202 that is descriptive and relevant for use in a reasoning process. For example, if the input signal 202 contains audio data, the reasoner 212 may generate audio tags, timestamps, and captions as attributes. If the input signal 202 contains video data, the reasoner 212 may generate objects, actions, scene descriptions, etc. as attributes. Other types of metadata may be generated as attributes when the input signal 202 contains sensor readings or other data streams.

As an example, for an input signal 202 that is an audio signal, audio attributes may include audio tags or labels identifying sounds and events occurring with the audio, such as "dog barking", "car passing", "people laughing" etc. The audio attributes may include timestamps indicating times at which certain audio events occur, such as for a "door slam" audio tag occurring at a specific time in the input signal 202. The attributes may include captions providing descriptions summarizing the audio contents. Similarly, for a video input signal, video attributes may include: objects or detected entities (e.g., "person", "car", "door") that are obtained from the video input signal; actions describing activities occurring in the video, such as "walking", "opening", or "talking" etc.; or scene descriptions summarizing the scene and general context represented in the video input signal. As another example, attributes for sensors or other input signals may include metadata readings (e.g., temperature, humidity, etc.) and/or sensor event labels representing one or more occurrences detected by the sensors, such as "loud noise" or "motion".

In some aspects, the reasoner 212 can retrieve context information related to the generated attributes. For an input signal 202 that is audio, the reasoner 212 can perform a search of an embedding repository for related audio events using similarity measures between attribute embeddings. For video, related scene embeddings may be retrieved. Thus, context information retrieved by the reasoned 212 can aid reasoning related to the query from prompt 204.

In some aspects, the reasoner 212 generates sub-queries based on the retrieved context information. Accordingly, the sub-queries can obtain and provide additional reasoning to arrive at an answer that addresses the query from prompt 204. For example, if the prompt 204 is "what is happening in the house?" and an input signal includes an audio signal with loud music and laughter, the reasoner 212 may generate, as part of a reasoning path, a sub-query of "How many voices are present?" to help determine if a party is occurring. Thus, a reasoning path works to decompose complex queries into simpler, more addressable sequences of sub-queries.

In some aspects, the reasoner 212 leverages the language model 206 to generate answers to each sub-query and include the answers in the reasoning path. In some examples, one or more machine learning (ML) models, such as neural network architectures, such as a transformer neural network, can be used to generate the answer to the sub-query. The language model 206 provides a sub-query answer, and the reasoner 212 evaluates confidence in whether the answer correctly addresses the sub-query.

The reasoner 212 proceeds down reasoning paths, sometimes down multiple reasoning paths at the same time (e.g., in parallel), where confidence for answers directed to sub-queries meet or exceed a confidence threshold. As an example, when confidence for an answer in a reasoning path dips below an acceptable threshold, that reasoning path terminates. The reasoner 212 can then aggregate and assemble such reasoning paths for use in arriving at an answer. In some examples, an assessment component selects among the accrued reasoning paths to pass to the decoder 210, such as a transformer decoder or LSTM decoder, and generate an output 214. For example, frequent mentions of relevant details across multiple reasoning sequences may form the basis for the answer (e.g., output 214). In some examples, the accrued reasoning paths are provided to the decoder 210 and the decoder 210 generates the output 214. As depicted in FIG. 2, the decoder 210 can be include in the language model 206. As further depicted in FIG. 2, the output 214 can include one or more answers 218A-218C. In some aspects, the output 214 can include one or more reasoning 220A-220C that support or otherwise explain a rational for the corresponding answer 218A-C. In some aspects, the input signal 202, and/or other input signals from other sensors (e.g., 112A-112D), can be stored for later use within the repository 216.

Figure 3:
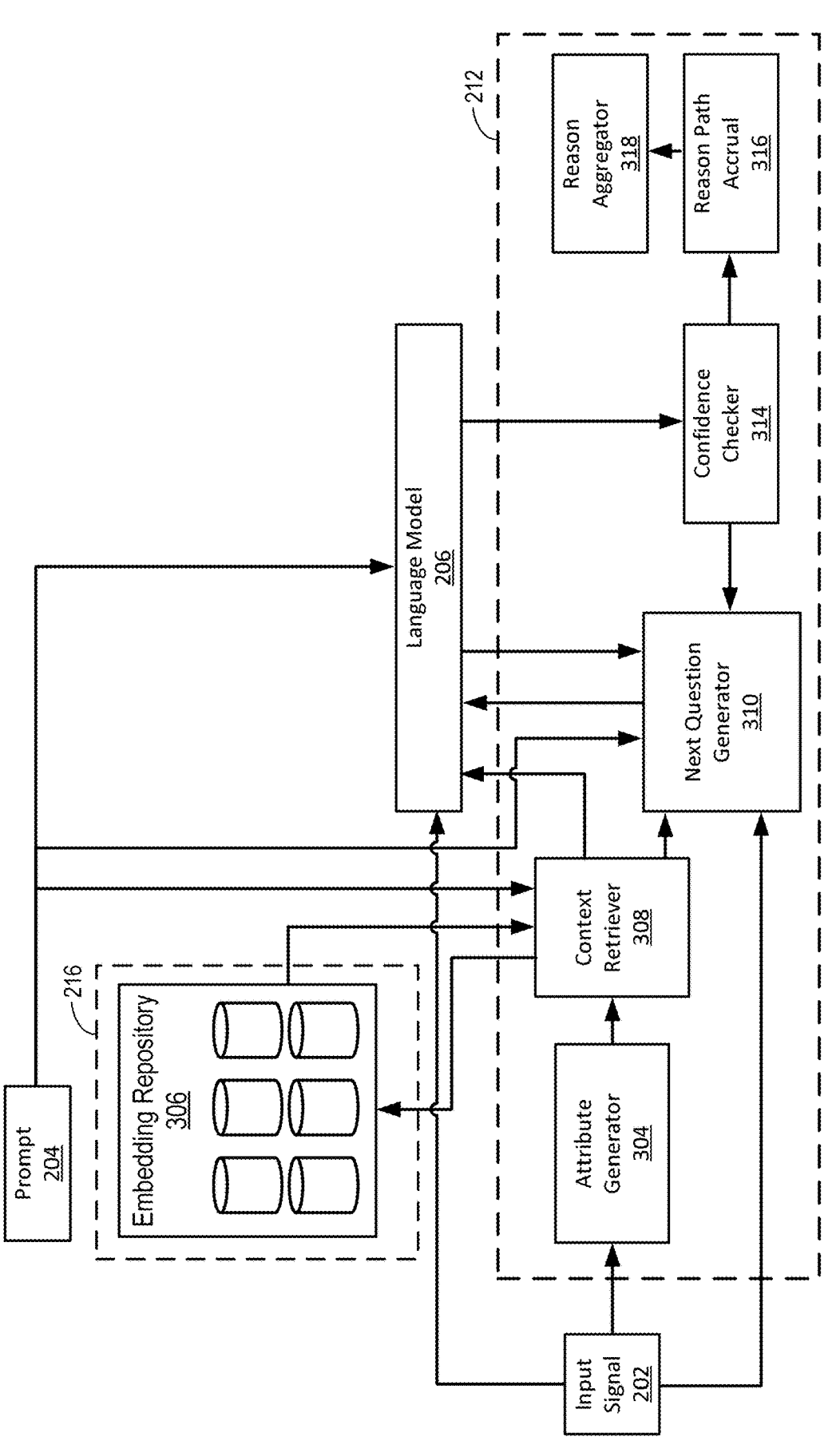
FIG. 3 depicts additional details of a reasoner in accordance with examples of the present disclosure.

FIG. 3 illustrates additional details of the reasoner 212 in accordance with certain aspects of the present disclosure. The reasoner 212 includes an attribute generator 304 that generates attributes about the input signal 202, a context retriever 308 that retrieves relevant contextual information from an embedding repository 306 of the repository 216 based on the generated attributes, a next question generator 310 that generates a next sub-query in the reasoning path based on one or more of the attributes, context, and/or prompt representation, a confidence checker 314 that checks the confidence of answers from the language model 206 to determine if more questions should be generated or if the reasoning path should be terminated, a reason path accrual 316 that accrues one or more reasoning paths (if more than one reasoning path is generated) generated by the next question generator 310, and a reason aggregator 318 that aggregates one or more reasoning paths (if more than one reasoning path is generated) to determine a final output answer and, in certain aspects, reasoning to the original query. In certain aspects, the reasoner 212 implements cross-attention to identify one or more interactions between the encoded representations (e.g., encoded representation of the query from prompt 204 and encoded representation of the input signal 202). Cross-attention emphasizes events in the input signal(s) that align to elements specified in the query, fusing relevance between the encoded representation for the query from prompt 204 and the encoded representation of the input signal 202. The cross-attended output may serve as input to the next question generator 310 for example, which constructs reasoning path(s) to answer the query from prompt 204 by focusing on relevant content obtained from the context retriever 308. Utilizing cross-attention improves reasoning precision by continuously grounding the sub-questions with relevant contextual information (e.g., in the form of embeddings) obtained from the embedding repository 306.

In certain aspects, the attribute generator 304, such as Wav2Vec2.0, or BERT for example, processes the input signal 202 to generate descriptive attributes and metadata about the input signal 202. For example, where the input signal 202 is an audio signal, the attribute generator 304 can utilize an audio tagging model or an audio captioning model to analyze the audio and generate textual tags and/or descriptions about the audio events present. The audio tagging model can analyze each timestamp of an input audio signal to generate tags identifying portions of the audio signal. Likewise, an audio captioning model can generate textual captions describing events in the audio. These tags and/or captions provide high-level semantic attributes about the input signal 202.

As an example, where the input signal 202 is an audio signal captured in a zoo environment, the attribute generator 304, utilizing an audio tagging model, can tag segments of the audio with textual tags such as "tiger roaring", "dog barking", identifying the types of animal sounds present. Likewise, an audio captioning model can generate captions like "tiger roaring loudly" and "dog barks twice." By processing the input signal 202 with an audio tagging model and an audio captioning model, the attribute generator 304 can effectively understand, at a high-level, the semantic context of the audio signal by identifying key audio events present and generate textual attribute metadata about those events that can inform downstream reasoning steps. The set of tags and captions serve as descriptive attributes about the semantic content.

The embedding repository 306 serves as a storage location, or database, that stores embeddings and metadata from the input signal 202, such as over time. That is, input signal 202, such as an audio signal, can be encoded and stored into the embedding repository 306 to provide contextual information. For example, the input signal 202 can be segmented and encoded, using one or more models, into semantic embeddings that contain learned feature representations of the input signal 202. These embeddings may capture meaningful information about the input signal 202. In some aspects, the embedding repository 306 may reside within the repository 216. In some aspects, the embedding repository 306 can reside outside of the repository 216.

Additionally, as described with respect to the attribute generator 304, metadata in the form of tags and captions that describe one or more events may be generated and stored along with their corresponding embeddings. This metadata may serve as timestamps and descriptions for different events. By storing the embedding information, the embedding repository 306 can serve as a "world knowledge" repository for the input signal 202. In certain aspects, the embedding repository 306 includes information describing when different events, such as audio events, occurred, what they represent semantically, etc.

Accordingly, contextual information based on one or more attributes of the input signal 202 can be retrieved by searching the embedding repository 306 for embeddings that are in close proximity to a subsequent query directed to the input signal 202. In certain aspects, proximity can be evaluated based on a cosine distance between two embeddings. In certain aspects, the relevant embeddings along with their timestamps can be returned in response to the prompt 204 and used for temporal and descriptive context about content obtained from the embedding repository 306 that can aid in reasoning with respect to the query from prompt 204.

In certain aspects, the context retriever 308 retrieves contextual information from the embedding repository 306 to provide additional context to aid the reasoning process. More specifically, when the attribute generator 304 generates semantic tags and captions about the input signal 202, these attributes can be used by the context retriever 308 to search the embedding repository 306 for related contextual information. As an example, if the attribute generator 304 generates an audio tag indicating "dog barking", the context retriever 308 can use this tag to query the embedding repository 306 for related content, such as related audio signals, and embeddings containing that type of event. In certain aspects, temporal constraints can also be used to identify related content during the search, for example to retrieve "dog barking" embeddings from the past week only.

In certain aspects, performing a similarity search through the embedding repository 306 using the attributes from the attribute generator 304 allows finding embeddings from other content that can provide useful context about similar scenarios. For example, the context retriever 308 may retrieve audio signals containing loud dog barking from past nights, providing context that dogs in the environment tend to bark loudly at night.

In certain aspects, the context retriever 308 passes embeddings and/or timestamps/metadata retrieved from the embedding repository 306 to the language model 206 and next question generator 310 to provide context in addition to the prompt 204 and input signal 202 that augment the input signal 202. This allows downstream reasoning tasks to use temporal and relational context about similar audio events that can aid in interpreting and reasoning about the input signal 202, such as an audio signal.

In certain aspects, the next question generator 310 generates a next sub-query to ask during the reasoning process to incrementally traverse a reasoning path. In certain aspects, the next question generator 310 may utilize a language model, such as the language model 206 to generate one or more questions. For example, the next question generator 310 can provide contents of a generated reasoning path, context from the context retriever 308, and/or prompt 204 to the language model 206 to obtain the next question. Alternatively, or in addition, the next question generator 310 may include one or more models for generating the next question. That is, in certain aspects, the reasoner 212 generates multiple reasoning paths by iteratively generating additional sub-queries until some stopping criteria is reached, indicating the reasoner 212's confidence level no longer meets a threshold confidence level. The next question generator 310 facilitates the iterative query generation. For example, the next question generator 310 receives as input, the current state of the reasoning path, including the latest sub-query and answer from the language model 206, the encoding representation of the query from the prompt 204, and the encoding representation of the input signal 202, as well as retrieved context about the input signal 202. In certain aspects, the next question generator 310 generates the next follow-up sub-query to further refine reasoning associated with the input signal 202 and query from prompt 204.

For example, where the input signal 202 is audio content and a query from prompt 204 is "What is happening in the house?," the next question generator 310 can generate a sub-query of "Are there people talking in the audio?" as a next incremental question to further classify and/or generate one or more reasoning paths based on the input signal 202 and the prompt 204. As another example, the next question generator 310 may generate the sub-query "When does the dog barking occur" to narrow down timing of certain events. The sub-queries are designed to provide additional information and direction towards reasoning about elements related to the query. This incremental building of a reasoning path provides the ability to traverse a line of reasoning before determining that the reasoned 212 is no longer confident in the answer, in which point, a current reasoning path can be terminated. In certain aspects, a new line of reasoning may be initiated.

In certain aspects, the next question generator 310 can automatically create sub-queries based on a predefined reasoning task rather than responding only to queries from the prompt 204. For instance, a general reasoning task could be configured to describe events within the input content. The next question generator 310 may generate incremental sub-questions targeted to satisfy a predefined goal, without an initial user query from the prompt 204. This allows automatic traversing of reasoning paths to accomplish high-level information goals even without an explicit user query from the prompt 204.

In certain aspects, the language model 206 functions as a reasoning engine that produces answers to the questions generated during the reasoning process. In certain aspects, the reasoning system 102 for question answering comprises a generator-discriminator type structure, where the language model 206 serves as the "generator" and the reasoner 212, and more specifically the next question generator 310 and confidence checker 314, serve as the "discriminator" that probes the generator. Thus, for each sub-query produced by the next question generator 310 to incrementally expand a reasoning path, this question is input to the language model 206. The language model 206, which can be implemented using an existing large pretrained language model like GPT-3/4®, Llama®, Claude, etc., produces an answer predicting the outcome to the sub-query based on the information currently available to it through the encoded representations and retrieved context from the context retriever 308.

For example, for the sub-query, "Are there people talking in the audio?", the language model 206 analyzes the audio input, encoding representations, and context and generates an answer in response the query. For example, the response may be "Yes, there are two distinct voices engaged in a conversation." As a reasoning path is built incrementally, the language model 206 produces answers to each follow-up question based on its reasoning using the information available to it. By iteratively prompting in such a directed way, reasoned answers output by the language model 206 can be obtained.

The confidence checker 314 analyzes the answers generated by the language model 312 to determine if the reasoning of the language model 312 no longer satisfies a confidence threshold. That is, as previously described, in certain aspects, the reasoning system 102 for question answering explores one or more reasoning paths by iteratively generating sub-queries that dig deeper into some aspect of the input signal 202 and an original query from the prompt 204. These sub-queries are answered by the language model 206. However, at some point, answers provided by the language model 206 may start becoming less coherent as the context gets too narrow or subtle, indicating the language model 206 is likely guessing rather than reasoning. The confidence checker 314 detects when this drop in reasoning occurs.

For example, in certain aspects, after each answer produced by the language model 206, the confidence checker 314 computes a confidence score for that answer. In certain aspects, the confidence score can be computed based on an entropy analysis of answer text, examining beam search probabilities, and/or utilizing self-consistency metrics. If the confidence score for the answer drops below some (e.g., predetermined) threshold, it triggers the next question generator 310 to stop expanding the current reasoning path, as it indicates the language model 312 is no longer producing meaningful answers. Thus, the confidence checker 314 monitors the quality of language model 206 answers to determine when the reasoning stops making progress. To avoid wandering down dead-ends and to maintain meaningful reasoning paths, the confidence checker 314 may terminate the reasoning path. In certain aspects, those path(s) that sustain high confidence scores can be expanded through multiple sub-queries before termination.

In certain aspects, the reason path accrual 316 accumulates the multiple reasoning paths (if more than one reasoning path is generated) generated through the iterative query generation process. As further described in FIG. 6, the overall reasoning approach may involve incrementally generating multiple reasoning paths by generating a sequence of sub-queries and answers along each path. Each reasoning path represents a unique chain of logical reasoning steps undertaken to answer the overall complex query.

In certain aspects, the reason path accrual 316 tracks these iterations and accumulates the context around the different reasoning paths. For each branch of reasoning, the reasoning path accrual 316 stores the sequence of questions and answers generated along the way before the branch was terminated. In certain aspects, once multiple paths have been generated, the reason path accrual 316 consolidates all the stored paths together. The reason path accrual 316 can then assess if any paths should be merged based on overlapping lines of reasoning. For instance, separate reasoning paths may determine that audio contains both music and singing—these can be aggregated into a single reasoning path with multiple evidence branches, as will be discussed in FIG. 6.

In certain aspects, conflicting paths can also be presented separately rather than combining reasoning (e.g. if separate evidence indicates audio is both indoors or outdoors). The consolidated reasoning paths can be output so downstream components can choose to present multiple alternative answers alongside the full reasoning that led to each. Or, in certain aspects, a single answer can be determined with aggregated multi-path reasoning explaining how different evidentiary steps were taken.

The reason aggregator 318 analyzes the multiple reasoning paths (if more than one reasoning path is generated) that have been created and accumulated to produce a final answer, and in certain aspects, consolidated output reasoning. In certain aspects, and as described with respect to the reason path accrual 316 component, one or more reasoning paths may be obtained, each with a sequence of generated sub-queries and answers for an aspect of reasoning about the input signal 202. The reason aggregator 318 can consolidate the reasons from across these different paths. For example, if one or more paths provide reasoning that indicates there is music playing, those paths can be aggregated into a consolidated answer.

Additionally, in certain aspects, the reason aggregator 318 can determine if reasoning paths conflict. That is, some reasoning paths may indicate music playing while others indicate audio is speech. Depending on system confidence thresholds, the reason aggregator 318 may determine an output based on a set of paths having a higher overall confidence. Or, in certain aspects, the reason aggregator 318 may present multiple contradictory answers and the specific reasoning behind each answer.

Finally, the reason aggregator 318 can compile all of the reasoning paths into a natural language summary output that answers the original query as provided by the prompt 204. That is, in certain aspects, the reason aggregator 318 combines the certain and conflicting reasoning paths from across multiple reasoning paths taken to produce a final output summary response to the query presented by the prompt 204.

Figure 4:
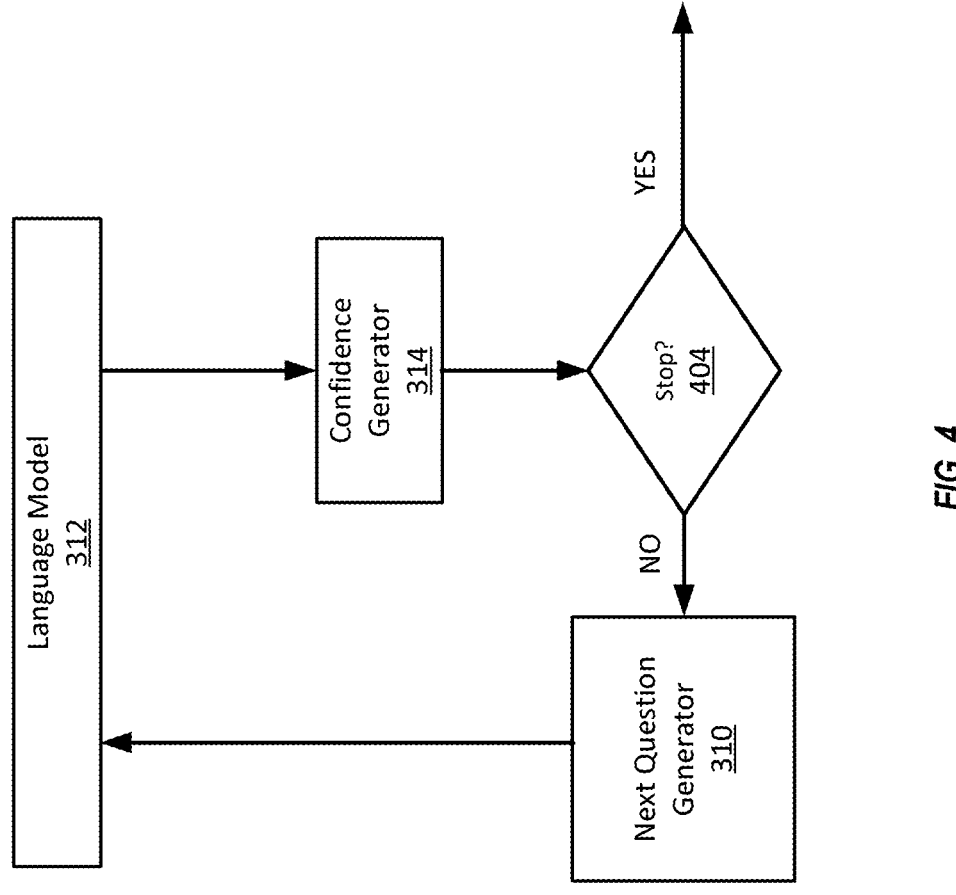
FIG. 4 depicts additional details directed to generating sub-queries.

FIG. 4 depicts an example process for checking the confidence of the language model answers during reasoning path generation. As described previously with respect to FIG. 3 and the reasoner 212, one or more reasoning paths may be iteratively obtained by generating follow-up sub-queries to further analyze aspects of the input signal. Each sub-query generated by the next question generator 310 is input to the language model, which produces a predicted answer to the question provided by the next question generator 310.

In certain aspects, the confidence checker 314 then analyzes one or more answers produced by the language model 312 to determine if the reasoning process should continue with additional follow-up questions. In certain aspects, a confidence score is computed for each answer based on entropy analysis, beam search probabilities, and/or self-consistency metrics. This confidence score can be compared to a predetermined threshold at 404 to determine if a reasoning path should be terminated. If the confidence score is below a threshold at 404, a current reasoning path is terminated since the language model 206 is more likely guessing rather than logically reasoning. In certain aspects, answers that meet or exceed a confidence threshold at 404 allow that reasoning path to continue expanding via additional automatically generated sub-queries, until some stopping point is ultimately reached.

Figure 5:
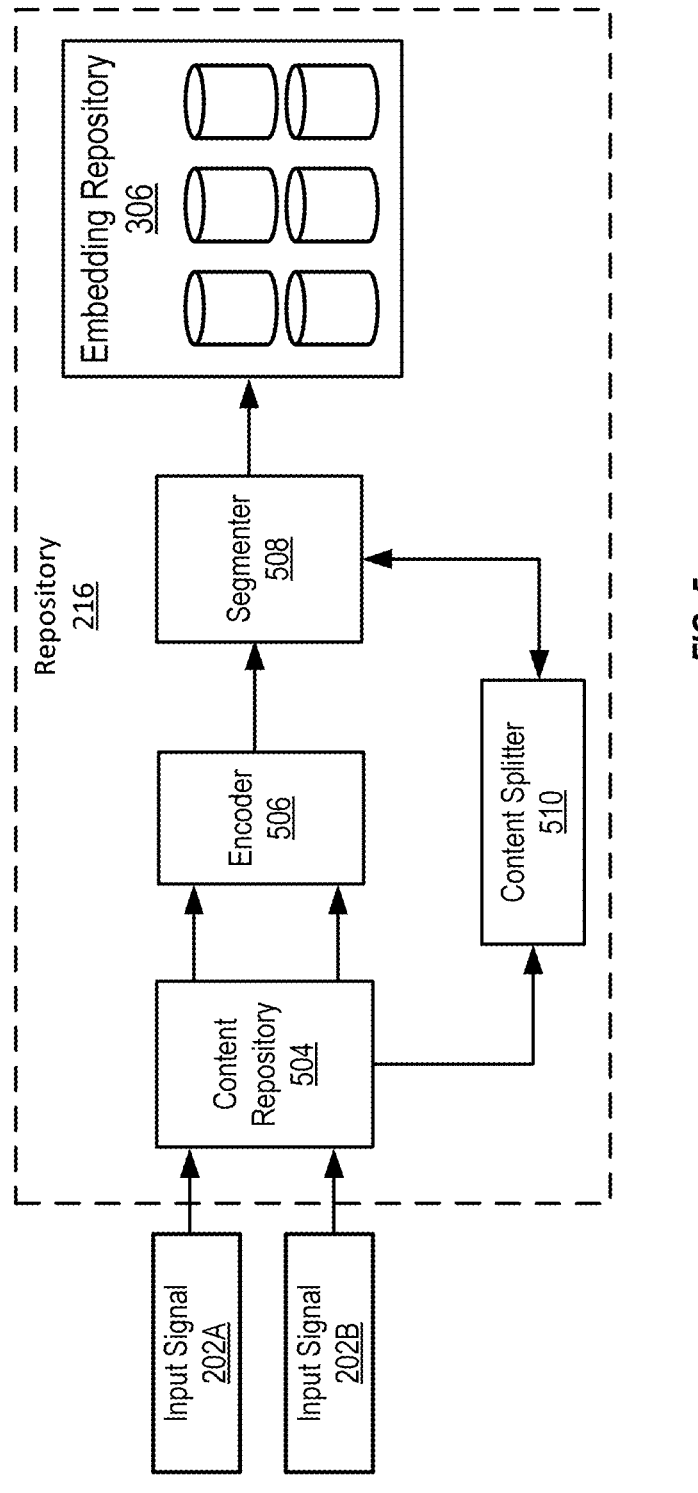
FIG. 5 depicts additional details directed to populating an embedding repository in accordance with examples of the present disclosure.

FIG. 5 depicts a content preprocessing pipeline that continually encodes and stores content from input signals (e.g., 202A, 202B) to facilitate retrieval of contextual information that may be relevant to an input signal 202 and prompt 204. In certain aspects, the input signal 202A, such as an audio signal, can be captured and stored into the content repository 504, providing persistent storage of data over time. The content splitter 510 can receive input signals 202A and/or 202B from the content repository 504 and divide the input signals 202A and/or 202B into segments of a defined length, such as 5 second audio clips.

In certain aspects, the content splitter 510 receives streams of input signals 202A/202B from the content repository 504. In certain aspects, the content splitter 510 then segments the continuous streams of data into fixed time intervals to facilitate downstream encoding and reasoning. For example, where the input signal 202A is an audio signal captured over time by a sensor, the input signal 202A could comprise extremely long and variable length audio spanning hours or days. To prepare this audio signal for future retrieval and querying, the content is divided into smaller, fixed partitions. In some aspects, the content splitter 510 segments audio content into standard clip lengths such as 5 second intervals. Video streams could similarly be divided into segments of fixed duration. The size of the segment can be configured based on desired granularity for retrieval and embedding of signal events during later querying.

Additionally, splitting the input signal 202A/202B into variable lengths could also be performed using automatically detected scene, event, or activity boundaries. In certain aspects, intelligent segmentation boundaries provide reasoning with self-contained units of content capturing related events that can simplify search. The segmented content is then provided to an encoder 506 which encodes each segment, such as into an embedded vector representation. Different encoder architectures tailored to the modality of data (audio, video, etc.) map segments into a common embedded feature space.

Additionally, a segmenter 508 analyzes the input signals (e.g., 202A/202B) to generate temporal metadata comprising descriptive tags and timestamps reflecting important events in the signals. For example, an audio signal can be tagged with textual labels describing audio events occurring in different timestamped regions. The encoded representation of each segment is persistently stored to the embedding repository 306 along with associated temporal metadata tags and timestamps from the segmenter 508. Storing this embedding and metadata history over time facilitates efficient similarity searching such that the context retriever 308, can leverage past signal context.

For example, an audio clip of 5 seconds could contain multiple sound events like a doorbell ringing, dog barking, and car passing. In certain aspects, the segmenter 508 can utilize audio recognition models to process the clip, detect these key events, assign textual tags to label them (e.g. "dog-bark", "car-passing"), and record precise timestamps of when the sounds occurred. Likewise for video, visual recognition models can pick out key people, objects, scenes, and actions appearing. Textual tags with frame-level time-stamps are again extracted. The output of the segmenter 508 can be an indexing of signal inputs to mark temporal regions of interest and describe what is happening; such output of the segmenter 508 can be stored in the embedding repository 306.

FIG. 6 illustrates an incremental reasoning and chaining of question-answer steps 600 taken to build one or more reasoning paths. As introduced in FIG. 3, the reasoner 212 can generate multiple reasoning paths by iteratively generating additional sub-queries until some stopping criteria is reached. More specifically, FIG. 6 depicts the sub-query generation process as a workflow, starting at 602 with a query from a prompt 204. The query from the prompt 204 may correspond to "What is happening in the house?" The next question generator 310, from FIG. 3, can create a follow-up query 604 of "Are there people talking?" seeking additional details. The language model 312 then reasons over the input signal 202 to produce answer 606, confirming talking is present. In certain aspects, the confidence checker 314 can generate a confidence score associated with the answer 606. If the confidence score generated at 608 meets or exceeds a threshold, the next question generator 310, from FIG. 3, creates another follow-up query 610 of "Is there laughter?" seeking additional audio classification details. The language model 206 then reasons over the input signal 202 and current reasoning path to produce answer 612, confirming there is laughter.

Further questions (e.g., 614, 622, 628, and 636) iteratively dig deeper into aspects related to the query from prompt 204, uncovering supporting audio details (e.g., 616, 624, 630, and 638) like music, laughter, specific song identification, and number of voices. In certain aspects, each question can be triggered automatically based on prior answers in order to traverse reasoning path, with the language model 206 deducing responses at each step.

In certain aspects, the confidence checker 314 (FIG. 3) monitors the quality of each answer (e.g., 618, 626, 632, 634, and 640, etc.) to determine valid stopping points where answer confidence is too low to continue and to avoid dead-end paths, such as stopping gat 620. Reasoning paths terminated in this manner are accrued and aggregated to enable overall answering with evidence. The cascading effect uncovers chains of evidence tied back to the query from the prompt 204, with multiple hypothesis paths explored. Final aggregated outputs provide answers and, in certain aspects, underlying evidentiary support for how conclusions were reached.

Certain aspects described herein may be implemented, at least in part, using some form of artificial intelligence (AI), e.g., the process of using a machine learning (ML) model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values. Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, and the like.

Aspects described herein may describe the performance of certain tasks and the technical solution of various technical problems by application of a specific type of ML model, such as an ANN. It should be understood, however, that other type(s) of ML models may be used in addition to or instead of an ANN. Hence, unless expressly recited, subject matter regarding an ML model is not necessarily intended to be limited to just an ANN solution. Further, it should be understood that, unless otherwise specifically stated, terms such "AI model," "ML model," "AI/ML model," "trained ML model," and the like are intended to be interchangeable.

Figure 7:
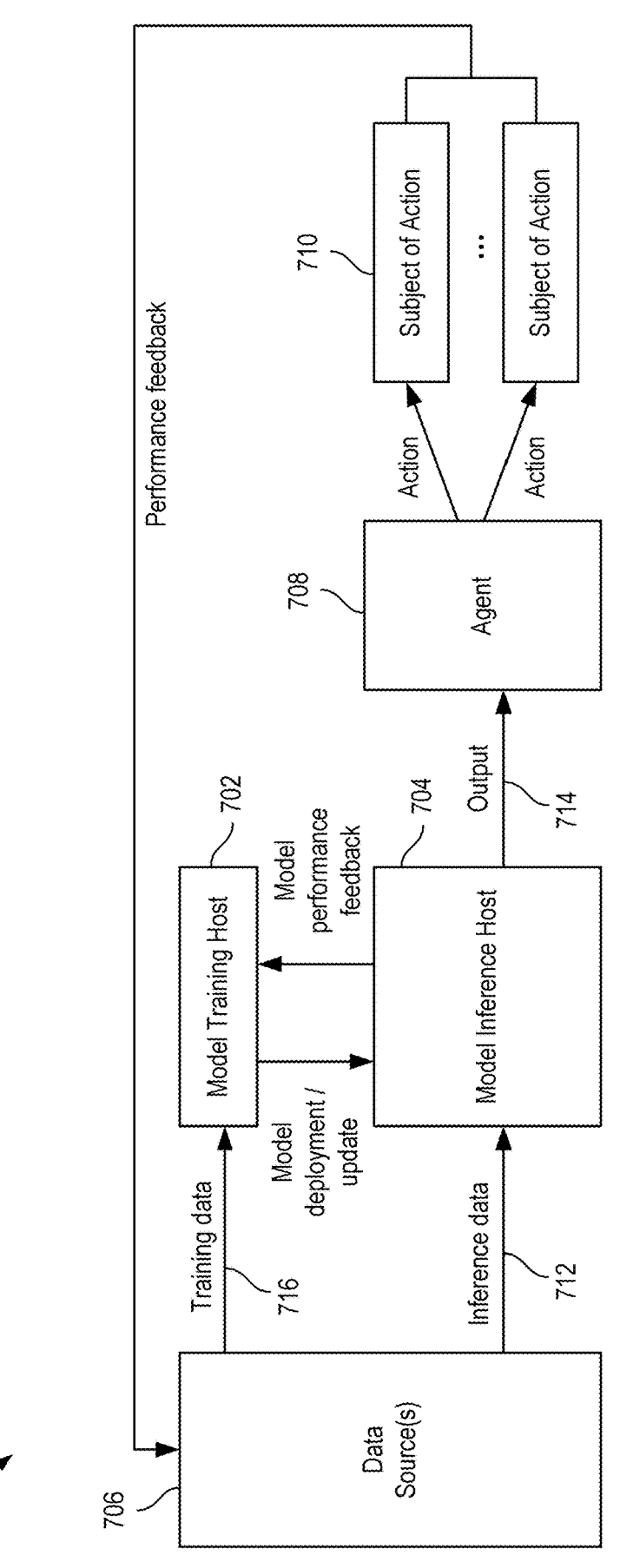
FIG. 7 depicts a diagram illustrating an example AI architecture that may be used for implementing one or more neural network models.

FIG. 7 is a diagram illustrating an example AI architecture 700 that may be used for implementing one or more neural network models. As illustrated, the architecture 700 includes multiple logical entities, such as a model training host 702, a model inference host 704, data source(s) 706, and an agent 708. The AI architecture may be used in any of various use cases for wireless communications, such as those listed above.

The model inference host 704, in the architecture 700, is configured to run an ML model based on inference data 712 provided by data source(s) 706. The model inference host 704 may produce an output 714 (e.g., a prediction or inference, such as a discrete or continuous value) based on the inference data 712, that is then provided as input to the agent 708. The type of agent 708 may be depend on the type of tasks performed by the model inference host 704, the type of inference data 712 provided to model inference host 704, and/or the type of output 714 produced by model inference host 704.

The data sources 706 may be configured for collecting data that is used as training data 716 for training an ML model, or as inference data 712 for feeding an ML model inference operation. In particular, the data sources 706 may collect data from any of various entities (e.g., LiDAR point clouds, image sensors, etc.), which may include the subject of action 710, and provide the collected data to a model training host 702 for ML model training. In some examples, if the output 714 provided to agent 708 is inaccurate (or the accuracy is below an accuracy threshold), the model training host 702 may determine to modify or retrain the ML model used by model inference host 704, such as via an ML model deployment/update.

In certain aspects, the model training host 702 may be deployed at or with the same or a different entity than that in which the model inference host 704 is deployed. For example, in order to offload model training processing, which can impact the performance of the model inference host 704, the model training host 702 may be deployed at a model server as further described herein. Further, in some cases, training and/or inference may be distributed amongst devices in a decentralized or federated fashion.

Figure 8:
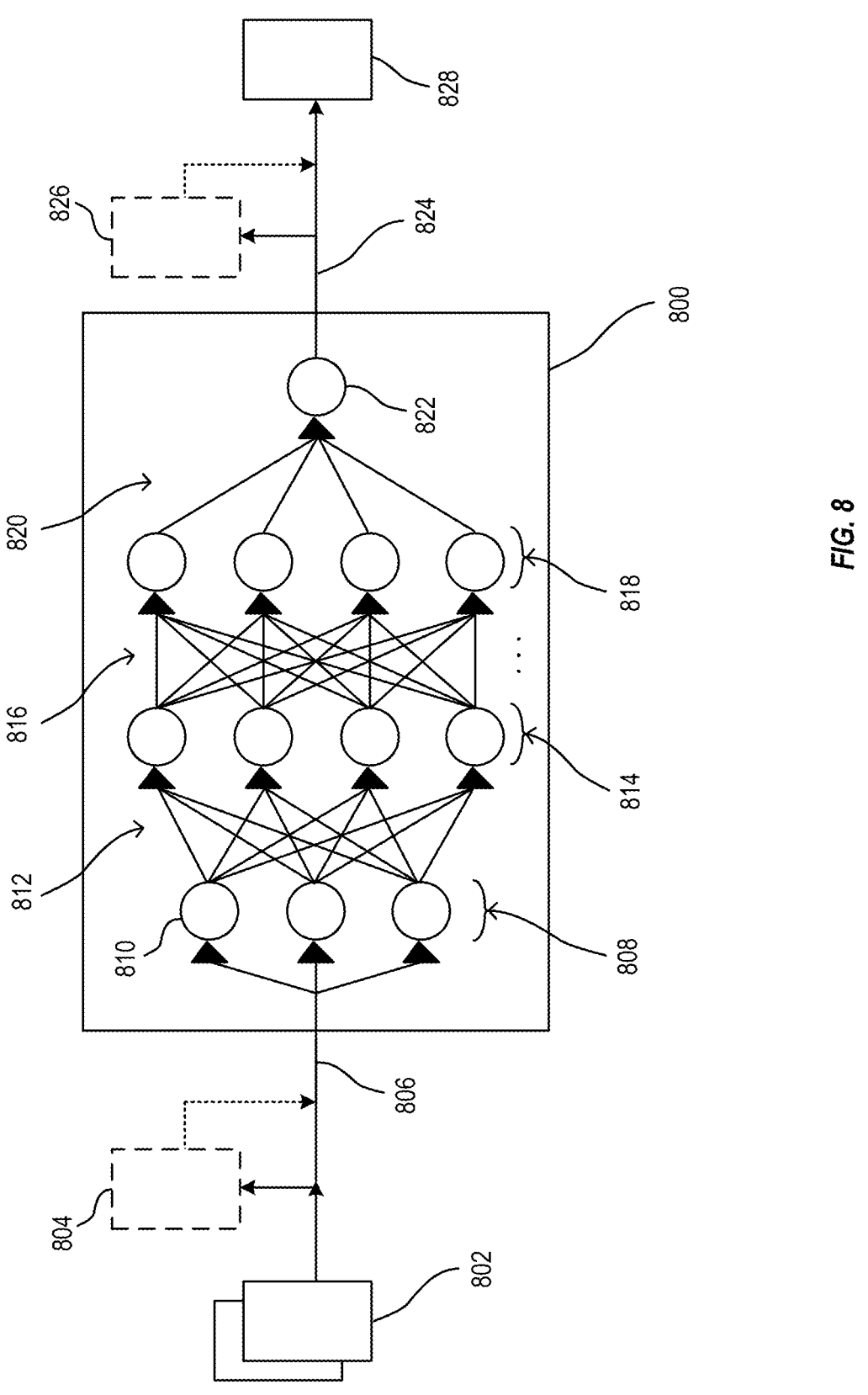
FIG. 8 depicts an illustrative block diagram of an example artificial neural network (ANN) according to examples of the present disclosure.

FIG. 8 is an illustrative block diagram of an example artificial neural network (ANN) 800.

ANN 800 may receive input data 806 which may include one or more bits of data 802, pre-processed data output from pre-processor 804 (optional), or some combination thereof. Here, data 802 may include training data, verification data, application-related data, or the like, e.g., depending on the stage of development and/or deployment of ANN 800. Pre-processor 804 may be included within ANN 800 in some other implementations. Pre-processor 804 may, for example, process all or a portion of data 802 which may result in some of data 802 being changed, replaced, deleted, etc. In some implementations, pre-processor 804 may add additional data to data 802.

ANN 800 includes at least one first layer 808 of artificial neurons 810 to process input data 806 and provide resulting first layer output data via edges 812 to at least a portion of at least one second layer 814. Second layer 814 processes data received via edges 812 and provides second layer output data via edges 816 to at least a portion of at least one third layer 818. Third layer 818 processes data received via edges 816 and provides third layer output data via edges 820 to at least a portion of a final layer 822 including one or more neurons to provide output data 824. All or part of output data 824 may be further processed in some manner by (optional) post-processor 826. Thus, in certain examples, ANN 800 may provide output data 828 that is based on output data 824, post-processed data output from post-processor 826, or some combination thereof. Post-processor 826 may be included within ANN 800 in some other implementations. Post-processor 826 may, for example, process all or a portion of output data 824 which may result in output data 828 being different, at least in part, to output data 824, e.g., as result of data being changed, replaced, deleted, etc. In some implementations, post-processor 826 may be configured to add additional data to output data 824. In this example, second layer 814 and third layer 818 represent intermediate or hidden layers that may be arranged in a hierarchical or other like structure. Although not explicitly shown, there may be one or more further intermediate layers between the second layer 814 and the third layer 818.

The structure and training of artificial neurons 810 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data. Different activation functions may be used to model different types of non-linear relationships. By introducing non-linearity into an ML model, an activation function allows the ML model to "learn" complex patterns and relationships in the input data 806. Some non-exhaustive example activation functions include a linear function, binary step function, sigmoid, tan h, ReLU and variants, exponential linear unit (ELU), Swish, Softmax, and others.

Design tools (such as computer applications, programs, etc.) may be used to select appropriate structures for ANN 800 and a number of layers and a number of artificial neurons in each layer, as well as selecting activation functions, a loss function, training processes, etc. Once an initial model has been designed, training of the model may be conducted using training data. Training data may include one or more datasets within which ANN 800 may detect, determine, identify or ascertain patterns. Training data may represent various types of information, including written, visual, audio, environmental context, operational properties, etc. During training, parameters of artificial neurons 810 may be changed, such as to minimize or otherwise reduce a loss function or a cost function. A training process may be repeated multiple times to fine-tune ANN 800 with each iteration.

Various ANN model structures are available for consideration. For example, in a feedforward ANN structure each artificial neuron 810 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 800 or other ML models may be implemented in various types of processing circuits along with memory and applicable instructions therein, for example, as described herein with respect to FIGS. 7 and 8. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools are available for developing ANN models.

There are a variety of model training techniques and processes that may be used prior to, or at some point following, deployment of an ML model, such as ANN 800 of FIG. 8.

As part of a model development process, information in the form of applicable training data may be gathered or otherwise created for use in training an ML model accordingly. Once an ML model has been trained with training data, its performance may be evaluated. In some scenarios, evaluation/verification tests may use a validation dataset, which may include data not in the training data, to compare the model's performance to baseline or other benchmark information. If model performance is deemed unsatisfactory, it may be beneficial to fine-tune the model, e.g., by changing its architecture, re-training it on the data, or using different optimization techniques, etc. Once a model's performance is deemed satisfactory, the model may be deployed accordingly. In certain instances, a model may be updated in some manner, e.g., all or part of the model may be changed or replaced, or undergo further training, just to name a few examples.

As part of a training process for an ANN, such as ANN 800 of FIG. 8, parameters affecting the functioning of the artificial neurons and layers may be adjusted. For example, backpropagation techniques may be used to train the ANN by iteratively adjusting weights and/or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and/or biases to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent (or ascent) technique may be used to adjust weights/biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model.

A "dropout" technique may be used to randomly drop out some of the artificial neurons from a model during a training process, e.g., in order to reduce overfitting and potentially improve the generalization of the model.

An "early stopping" technique may be used to stop an on-going training process early, such as when a performance of the model using a validation dataset starts to degrade.

Another example technique includes data augmentation to generate additional training data by applying transformations to all or part of the training information.

A transfer learning technique may be used which involves using a pre-trained model as a starting point for training a new model, which may be useful when training data is limited or when there are multiple tasks that are related to each other.

A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ML model is some form of a "pruning" technique. A pruning technique, which may be performed during a training process or after a model has been trained, involves the removal of unnecessary (e.g., because they have no impact on the output) or less necessary (e.g., because they have negligible impact on the output), or possibly redundant features from a model. In certain instances, a pruning technique may reduce the complexity of a model or improve efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that may need to be transmitted or stored.

Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment, and less aggressively prune the model for use in a high-power or high-bandwidth environment. In certain aspects, pruning techniques also may be applied to training data, e.g., to remove outliers, etc. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting, or otherwise improve the performance of the trained model.

One or more of the example training techniques presented above may be employed as part of a training process. As above, some example training processes that may be used to train an ML model include supervised learning, unsupervised learning, semi-supervised learning, and reinforcement learning technique.

Decentralized, distributed, or shared learning, such as federated learning, may enable training on data distributed across multiple devices or organizations, without the need to centralize data or the training. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ML model to be trained on data collected from a wide range of devices and environments. For example, an ML model may be trained on data collected from a large number of wireless devices in a network, such as distributed wireless communication nodes, smartphones, or internet-of-things (IoT) devices, to improve the network's performance and efficiency. With federated learning, a user equipment (UE) or other device may receive a copy of all or part of a model and perform local training on such copy of all or part of the model using locally available training data. Such a device may provide update information (e.g., trainable parameter gradients) regarding the locally trained model to one or more other devices (such as a network entity or a server) where the updates from other-like devices (such as other UEs) may be aggregated and used to provide an update to a shared model or the like. A federated learning process may be repeated iteratively until all or part of a model obtains a satisfactory level of performance. Federated learning may enable devices to protect the privacy and security of local data, while supporting collaboration regarding training and updating of all or part of a shared model.

Example Method for Generating an Answer to a Query

Figure 9:
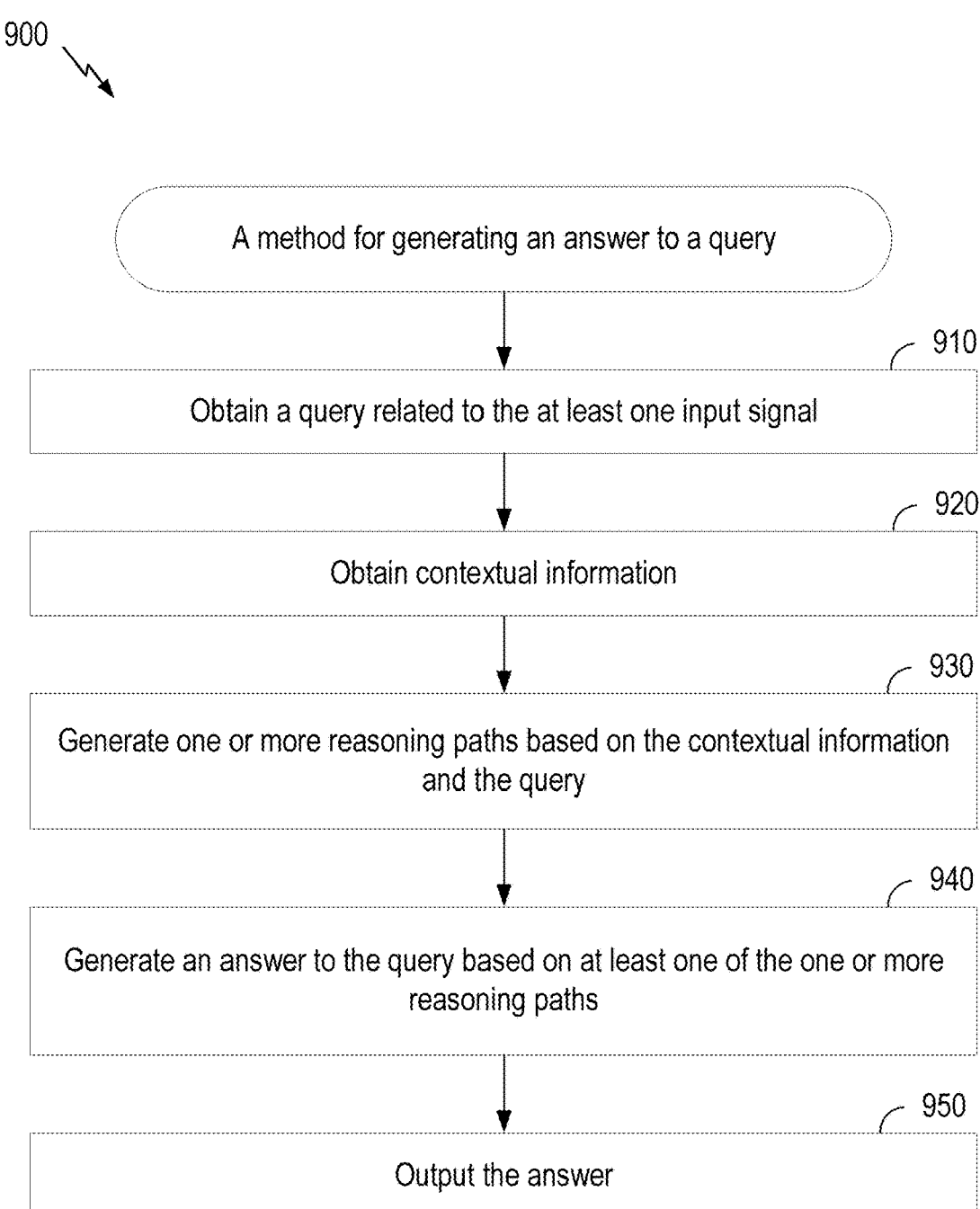
FIG. 9 depicts an example method for generating an answer to a query.

FIG. 9 shows a method 900 for generating an answer to a query. In one aspect, method 900 can be implemented by the reasoning system 102 of FIG. 1 or the reasoning system 102 of FIG. 2.

Method 900 begins at 910 with obtaining a query related to the at least one input signal.

Method 900 then proceeds to 920 with obtaining contextual information.

In certain aspects of method 900, obtaining the contextual information includes receiving the at least one input signal, and encoding the at least one input signal to generate at least one encoded input signal representation comprising portions of the at least one input signal associated with corresponding metadata, wherein the contextual information comprises at least a portion of the at least one encoded input signal representation.

In certain aspects of method 900, the metadata comprises semantically aware embedding vectors associated with the portions of the at least one input signal.

In certain aspects of method 900, the metadata comprises one or more of: tags identifying the portions of the at least one input signal or timestamps associated with the portions of the at least one input signal.

In certain aspects, method 900 further includes encoding the query into an encoded representation of the query, the contextual information and the encoded representation of the query being encoded into a common embedded space.

In certain aspects of method 900, determining the at least the portion of the at least one encoded input signal representation to obtain based on the query includes performing cross attention between the at least one encoded input signal representation and the encoded representation of the query to generate a cross-attended output; and determining the at least the portion of the at least one encoded input signal representation to obtain based on the cross-attended output.

In certain aspects of method 900, obtaining the contextual information includes determining the at least the portion of the at least one encoded input signal representation to obtain based on the query.

Method 900 then proceeds to 930 with generating, using at least one machine learning model, one or more reasoning paths based on the contextual information and the query. In certain aspects, each of the one or more reasoning paths comprising a sequence of respective one or more sub-queries and respective one or more sub-query answers corresponding to the respective one or more sub-queries.

In certain aspects of method 900, generating the one or more reasoning paths based on the contextual information and the query includes generating the one or more reasoning paths based on the contextual information and an encoded representation of the query, the contextual information and the encoded representation of the query being encoded into a common embedded space.

In certain aspects of method 900, each of the respective one or more sub-queries are based on the encoded representation of the query and the contextual information.

In certain aspects of method 900, generating each of the one or more reasoning paths includes using the at least one machine learning model to iteratively generate an additional sub-query answer of the respective one or more sub-query answers until a confidence level of a current sub-query answer does not satisfy a threshold confidence.

Method 900 then proceeds to 940 with generating an answer to the query based on at least one of the one or more reasoning paths.

In certain aspects of method 900, generating the answer to the query includes accruing the one or more reasoning paths.

Method 900 then concludes at block 950 with outputting the answer.

In certain aspects of method 900, the at least one input signal comprises at least one of an audio signal, a video signal, a sensor signal, or a combination thereof.

In certain aspects of method 900, method 900 includes generating at least one additional answer to the query based on at least one reasoning path of the one or more reasoning paths; and outputting the at least one additional answer.

In certain aspects of method 900, the query is automatically generated based on a predefined task.

In certain aspects, method 900 includes receiving, by a modem coupled to one or more antennas, the at least one input signal captured by one or more sensors.

In certain aspects of method 900, the modem and one or more antennas are integrated into one of a vehicle, an extra-reality device, or a mobile device.

In certain aspects, method 900 includes outputting at least a portion of the at least one of the one or more reasoning paths.

In certain aspects of method 900, the at least the portion of the at least one of the one or more reasoning paths comprises an interpretation of how the answer was determined.

In certain aspects of method 900, the answer comprises a natural language response.

In certain aspects, method 900 includes receiving user input selecting the answer among a plurality of answers; and outputting the at least one of the one or more reasoning paths based on the selecting the answer.

Note that FIG. 9 is just one example of a method, and other methods including fewer, additional, or alternative steps are possible consistent with this disclosure.

In one aspect, method 900, or any aspect related to it, may be performed by the processing system 1000 of FIG. 10, which includes various components operable, configured, or adapted to perform the method 900. Processing system 1000 is described below in further detail.

Example Processing System of a Reasoning System

FIG. 10 depicts aspects of an example processing system 1000.

The processing system 1000 includes a processing system 1002 includes one or more processors 1020. The one or more processors 1020 are coupled to a computer-readable medium/memory 1030 via a bus 1006. In certain aspects, the computer-readable medium/memory 1030 is configured to store instructions (e.g., computer-executable code) that when executed by the one or more processors 1020, cause the one or more processors 1020 to perform the method 900 described with respect to FIG. 9, or any aspect related to it, including any additional steps or sub-steps described in relation to FIG. 9.

In the depicted example, computer-readable medium/memory 1030 stores code (e.g., executable instructions) for obtaining a query related to the at least one input signal 1031, code for obtaining the contextual information 1032, code for generating one or more reasoning paths based on the contextual information and the query 1033, code for generating an answer to the query based on at least one of the one or more reasoning paths 1034, and code for outputting the answer 1035. Processing of the code 1031-1035 may enable and cause the processing system 1000 to perform the method 900 described with respect to FIG. 9, or any aspect related to it.

The one or more processors 1020 include circuitry configured to implement (e.g., execute) the code stored in the computer-readable medium/memory 1030, including circuitry for obtaining a query related to the at least one input signal 1021, circuitry for obtaining the contextual information 1022, circuitry for generating one or more reasoning paths based on the contextual information and the query 1023, circuitry for generating an answer 1024, and circuitry for outputting the answer 1025. Processing with circuitry 1021-1025 may enable and cause the processing system 1000 to perform the method 900 described with respect to FIG. 9, or any aspect related to it.

Example Clauses

Implementation examples are described in the following numbered clauses:

Clause 1: A method for generating an output answer using a reasoning system, comprising: obtaining a query related to at least one input signal; obtaining contextual information associated with the at least one input signal; generating, using at least one machine learning model, one or more reasoning paths based on the contextual information and the query, each of the one or more reasoning paths comprising a sequence of respective one or more sub-queries and respective one or more sub-query answers corresponding to the respective one or more sub-queries; generating an answer to the query based on at least one of the one or more reasoning paths; and outputting the answer.

Clause 2: A method in accordance with Clause 1, wherein generating the one or more reasoning paths based on the contextual information and the query comprises generating the one or more reasoning paths based on the contextual information and an encoded representation of the query, the contextual information and the encoded representation of the query being encoded into a common embedded space.

Clause 3: A method in accordance with Clause 2, further comprising generating each of the respective one or more sub-queries based on the encoded representation of the query and the contextual information.

Clause 4: A method in accordance with any one of Clauses 1-3, wherein obtaining the contextual information comprises: receiving the at least one input signal; and encoding the at least one input signal to generate at least one encoded input signal representation comprising portions of the at least one input signal associated with corresponding metadata, wherein the contextual information comprises at least a portion of the at least one encoded input signal representation.

Clause 5: A method in accordance with Clause 4, wherein the metadata comprises semantically aware embedding vectors associated with the portions of the at least one input signal.

Clause 6: A method in accordance with Clause 4, wherein the metadata comprises one or more of: tags identifying the portions of the at least one input signal or timestamps associated with the portions of the at least one input signal.

Clause 7: A method in accordance with Clause 4, further comprising encoding the query into an encoded representation of the query, the contextual information and the encoded representation of the query being encoded into a common embedded space.

Clause 8: A method in accordance with Clause 7, wherein determining the at least the portion of the at least one encoded input signal representation to obtain based on the query comprises: performing cross attention between the at least one encoded input signal representation and the encoded representation of the query to generate a cross-attended output; and determining the at least the portion of the at least one encoded input signal representation to obtain based on the cross-attended output.

Clause 9: A method in accordance with Clause 4, wherein obtaining the contextual information comprises determining the at least the portion of the at least one encoded input signal representation to obtain based on the query.

Clause 10: A method in accordance with any one of Clauses 1-9, wherein the at least one input signal comprises at least one of an audio signal, a video signal, a sensor signal, or a combination thereof.

Clause 11: A method in accordance with any one of Clauses 1-10, wherein generating each of the one or more reasoning paths comprises using the at least one machine learning model to iteratively generate an additional sub-query answer of the respective one or more sub-query answers until a confidence level of a current sub-query answer does not satisfy a threshold confidence.

Clause 12: A method in accordance with any one of Clauses 1-11, wherein generating the answer to the query comprises accruing the one or more reasoning paths.

Clause 13: A method in accordance with any one of Clauses 1-12, further comprising: generating at least one additional answer to the query based on at least one reasoning path of the one or more reasoning paths; and outputting the at least one additional answer.

Clause 14: A method in accordance with any one of Clauses 1-13, wherein the query is automatically generated based on a predefined task.

Clause 15: A method in accordance with any one of Clauses 1-14, further comprising a modem, coupled to one or more antennas, receiving the at least one input signal captured by one or more sensors.

Clause 16: A method in accordance with Clause 15, wherein the modem and one or more antennas are integrated into one of a vehicle, an extra-reality device, or a mobile device.

Clause 17: A method in accordance with any one of Clauses 1-16, further comprising: outputting at least a portion of the at least one of the one or more reasoning paths.

Clause 18: A method in accordance with Clause 17, wherein the at least the portion of the at least one of the one or more reasoning paths comprises an interpretation of how the answer was determined.

Clause 19: A method in accordance with any one of Clauses 1-18, wherein the answer comprises a natural language response.

Clause 20: A method in accordance with any one of Clauses 1-19, further comprising: receiving user input selecting the answer among a plurality of answers; and outputting the at least one of the one or more reasoning paths based on the selecting the answer.

Clause 21: A method in accordance with any one of Clauses 1-20, further comprising a microphone configured to obtain the at least one input signal.

Clause 22: One or more apparatuses, comprising: one or more memories comprising executable instructions; and one or more processors configured to execute the executable instructions and cause the one or more apparatuses to perform a method in accordance with any one of clauses 1-21.

Clause 23: One or more apparatuses, comprising: one or more memories; and one or more processors, coupled to the one or more memories, configured to cause the one or more apparatuses to perform a method in accordance with any one of Clauses 1-21.

Clause 24: One or more apparatuses, comprising: one or more memories; and one or more processors, coupled to the one or more memories, configured to perform a method in accordance with any one of Clauses 1-21.

Clause 25: One or more apparatuses, comprising means for performing a method in accordance with any one of Clauses 1-21.

Clause 26: One or more non-transitory computer-readable media comprising executable instructions that, when executed by one or more processors of one or more apparatuses, cause the one or more apparatuses to perform a method in accordance with any one of Clauses 1-21.

Clause 27: One or more computer program products embodied on one or more computer-readable storage media comprising code for performing a method in accordance with any one of Clauses 1-21.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus, comprising:
   one or more memories configured to store contextual information associated with at least one input signal; and
   one or more processors, coupled to the one or more memories, configured to:
      obtain a query related to the at least one input signal;
      obtain the contextual information;
      generate, using at least one machine learning model, one or more reasoning paths based on the contextual information and the query, each of the one or more reasoning paths comprising a sequence of respective one or more sub-queries and respective one or more sub-query answers corresponding to the respective one or more sub-queries;
      generate an answer to the query based on at least one of the one or more reasoning paths; and
      output the answer.

2. The apparatus of claim 1, wherein to generate the one or more reasoning paths based on the contextual information and the query, the one or more processors are configured to generate the one or more reasoning paths based on the contextual information and an encoded representation of the query, the contextual information and the encoded representation of the query being encoded into a common embedded space.

3. The apparatus of claim 2, wherein the one or more processors are configured to generate each of the respective one or more sub-queries based on the encoded representation of the query and the contextual information.

4. The apparatus of claim 1, wherein to obtain the contextual information, the one or more processors are configured to:
   receive the at least one input signal; and
   encode the at least one input signal to generate at least one encoded input signal representation comprising portions of the at least one input signal associated with corresponding metadata, wherein the contextual information comprises at least a portion of the at least one encoded input signal representation.

5. The apparatus of claim 4, wherein the metadata comprises one or more of: semantically aware embedding vectors associated with the portions of the at least one input signal, tags identifying the portions of the at least one input signal, or timestamps associated with the portions of the at least one input signal.

6. The apparatus of claim 4, wherein the one or more processors are configured to:

encode the query into an encoded representation of the query, the contextual information and the encoded representation of the query being encoded into a common embedded space.

7. The apparatus of claim 6, wherein to determine the at least the portion of the at least one encoded input signal representation to obtain based on the query, the one or more processors are configured to:

perform cross attention between the at least one encoded input signal representation and the encoded representation of the query to generate a cross-attended output; and determine the at least the portion of the at least one encoded input signal representation to obtain based on the cross-attended output.

8. The apparatus of claim 4, wherein to obtain the contextual information, the one or more processors are configured to:

determine the at least the portion of the at least one encoded input signal representation to obtain based on the query.

9. The apparatus of claim 1, wherein the at least one input signal comprises at least one of an audio signal, a video signal, a sensor signal, or a combination thereof.

10. The apparatus of claim 1, wherein to generate each of the one or more reasoning paths, the one or more processors are configured to:

use the at least one machine learning model to iteratively generate an additional sub-query answer of the respective one or more sub-query answers until a confidence level of a current sub-query answer does not satisfy a threshold confidence.

11. The apparatus of claim 1, wherein to generate the answer to the query, the one or more processors are configured to:

accrue the one or more reasoning paths.

12. The apparatus of claim 1, wherein the one or more processors are configured to:

generate at least one additional answer to the query based on at least one reasoning path of the one or more reasoning paths; and output the at least one additional answer.

13. The apparatus of claim 1, further comprising a modem, coupled to one or more antennas, and coupled to the one or more processors, wherein the modem and one or more antennas are configured to receive the at least one input signal captured by one or more sensors.

14. The apparatus of claim 13, wherein the modem and one or more antennas are integrated into one of a vehicle, an extra-reality device, or a mobile device.

15. The apparatus of claim 1, wherein the one or more processors are configured to:

output at least a portion of the at least one of the one or more reasoning paths.

16. The apparatus of claim 15, wherein the at least the portion of the at least one of the one or more reasoning paths comprises an interpretation of how the answer was determined.

17. The apparatus of claim 1, wherein the answer comprises a natural language response.

18. The apparatus of claim 1, wherein the one or more processors are configured to:

receive user input selecting the answer among a plurality of answers; and output the at least one of the one or more reasoning paths based on the selecting the answer.

19. The apparatus of claim 1, further comprising a microphone configured to obtain the at least one input signal.

20. A non-transitory computer-readable medium storing program code for causing a processing system to perform the steps of:

obtaining a query related to at least one input signal;

obtaining contextual information associated with the at least one input signal;

generating, using at least one machine learning model, one or more reasoning paths based on the contextual information and the query, each of the one or more reasoning paths comprising a sequence of respective one or more sub-queries and respective one or more sub-query answers corresponding to the respective one or more sub-queries;

generating an answer to the query based on at least one of the one or more reasoning paths; and outputting the answer.

\* \* \* \* \*